(12) United States Patent
Lim

(10) Patent No.: US 12,391,228 B2
(45) Date of Patent: Aug. 19, 2025

(54) ELECTRONIC BRAKE FOR VEHICLE AND CONTROL METHOD THEREFOR

(71) Applicant: HYUNDAI MOBIS Co., Ltd., Seoul (KR)

(72) Inventor: Jae Il Lim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 462 days.

(21) Appl. No.: 17/850,171

(22) Filed: Jun. 27, 2022

(65) Prior Publication Data

US 2023/0144112 A1 May 11, 2023

(30) Foreign Application Priority Data

Nov. 5, 2021 (KR) .................. 10-2021-0151793

(51) Int. Cl.
| | |
|---|---|
| *B60T 8/94* | (2006.01) |
| *B60T 8/32* | (2006.01) |
| *B60T 13/58* | (2006.01) |
| *B60T 13/68* | (2006.01) |
| *B60T 13/74* | (2006.01) |
| *B60T 17/22* | (2006.01) |

(52) U.S. Cl.
CPC ................ *B60T 8/94* (2013.01); *B60T 8/326* (2013.01); *B60T 13/58* (2013.01); *B60T 13/686* (2013.01); *B60T 13/74* (2013.01); *B60T 17/22* (2013.01); *B60T 2201/03* (2013.01); *B60T 2220/04* (2013.01); *B60T 2270/402* (2013.01); *B60T 2270/404* (2013.01); *B60T 2270/406* (2013.01); *B60T 2270/82* (2013.01)

(58) Field of Classification Search
CPC . B60T 8/94; B60T 8/326; B60T 13/58; B60T 13/686; B60T 13/74; B60T 17/22; B60T 2201/03; B60T 220/04; B60T 2270/402; B60T 2270/404; B60T 2270/406; B60T 2270/82; B60T 7/042; B60T 13/146; B60T 13/662; B60T 13/745; B60T 17/221; B60T 2270/40; B60T 13/142
See application file for complete search history.

(56) References Cited

U.S. PATENT DOCUMENTS

| | | | | |
|---|---|---|---|---|
| 6,318,817 | B1 * | 11/2001 | Martin .................. | B60T 13/686 303/116.1 |
| 6,454,364 | B1 * | 9/2002 | Niwa ................... | B60K 17/354 303/3 |
| 6,508,523 | B2 * | 1/2003 | Yoshino ................ | B60L 7/26 903/917 |
| 6,957,871 | B2 * | 10/2005 | Maki .................... | B60T 13/586 303/114.1 |
| 7,309,112 | B2 * | 12/2007 | Isono ................... | B60W 10/18 303/114.1 |

(Continued)

*Primary Examiner* — Robert A. Siconolfi
*Assistant Examiner* — James K Hsiao
(74) *Attorney, Agent, or Firm* — Morgan, Lewis & Bockius LLP

(57) ABSTRACT

An electronic brake for a vehicle and a control method therefor according to an embodiment of the present disclosure are able to generate a braking force required to safely run the vehicle even if something is wrong with a main brake device, by controlling an auxiliary brake device, which generates a required braking force by serving as a backup for the main brake device.

11 Claims, 3 Drawing Sheets

(56) References Cited

U.S. PATENT DOCUMENTS

| | | | | |
|---|---|---|---|---|
| 8,931,856 B2* | 1/2015 | Okano | B60T 1/10 | 303/3 |
| 9,010,880 B2* | 4/2015 | Yamasoe | B60T 8/4077 | 303/114.1 |
| 9,145,119 B2* | 9/2015 | Biller | B60T 8/17 | |
| 9,296,370 B2* | 3/2016 | McClain | B60T 7/042 | |
| 9,415,758 B2* | 8/2016 | Drumm | B60T 13/686 | |
| 10,137,877 B2* | 11/2018 | Feigel | B60T 8/4081 | |
| 10,358,119 B2* | 7/2019 | Besier | B60T 13/142 | |
| 11,648,924 B2* | 5/2023 | Maj | B60T 8/326 | 303/6.01 |
| 2003/0038541 A1* | 2/2003 | Suzuki | B60T 7/042 | 303/146 |
| 2004/0090115 A1* | 5/2004 | Inoue | B60T 8/368 | 303/DIG. 10 |
| 2006/0158026 A1* | 7/2006 | Aoki | B60T 13/145 | 303/114.1 |
| 2006/0197373 A1* | 9/2006 | Kanagawa | B60T 13/145 | 303/11 |
| 2007/0241611 A1* | 10/2007 | Shimada | B60K 6/44 | 303/155 |
| 2008/0093179 A1* | 4/2008 | Jager | B60W 10/184 | 701/22 |
| 2010/0206673 A1* | 8/2010 | Hitzel | B60T 8/267 | 188/106 R |
| 2010/0270854 A1* | 10/2010 | Okano | B60T 8/4081 | 303/3 |
| 2010/0282549 A1* | 11/2010 | Feigel | B60T 8/4072 | 188/110 |
| 2011/0115282 A1* | 5/2011 | Dinkel | B60T 13/143 | 303/3 |
| 2011/0241417 A1* | 10/2011 | Miyazaki | B60T 13/166 | 303/2 |
| 2012/0212044 A1* | 8/2012 | Nakamura | B60L 7/18 | 303/9.62 |
| 2013/0062932 A1* | 3/2013 | Yagashira | B60L 7/14 | 303/3 |
| 2013/0127236 A1* | 5/2013 | Hakiai | B60T 17/04 | 303/3 |
| 2014/0203626 A1* | 7/2014 | Biller | B60T 7/02 | 303/14 |
| 2015/0151726 A1* | 6/2015 | McClain | B60T 8/92 | 303/15 |
| 2016/0009267 A1* | 1/2016 | Lesinski, Jr. | B60T 7/12 | 303/10 |
| 2016/0023644 A1* | 1/2016 | Feigel | B60T 8/4081 | 303/3 |
| 2016/0159225 A1* | 6/2016 | Nakatsu | B60L 15/2009 | 701/70 |
| 2016/0264113 A1* | 9/2016 | Feigel | B60T 8/4086 | |
| 2016/0347298 A1* | 12/2016 | Jung | B60T 13/166 | |
| 2017/0072920 A1* | 3/2017 | Besier | B60T 8/4081 | |
| 2017/0274884 A1* | 9/2017 | Besier | B60T 13/686 | |
| 2017/0282877 A1* | 10/2017 | Besier | B60T 8/885 | |
| 2017/0361825 A1* | 12/2017 | Drumm | B60T 8/4081 | |
| 2018/0126971 A1* | 5/2018 | Leiber | B60T 8/326 | |
| 2018/0162332 A1* | 6/2018 | Nakazawa | B60T 7/22 | |
| 2019/0039579 A1* | 2/2019 | Ohkubo | B60L 7/26 | |
| 2019/0308601 A1* | 10/2019 | Maj | B60T 13/161 | |
| 2019/0344767 A1* | 11/2019 | Bareiss | B60T 7/12 | |
| 2019/0344769 A1* | 11/2019 | Zimmermann | B60T 8/326 | |
| 2021/0070267 A1* | 3/2021 | Weh | B60T 8/4081 | |
| 2024/0100957 A1* | 3/2024 | Andreasson | B60T 8/3215 | |

* cited by examiner

ELECTRONIC BRAKE FOR VEHICLE AND CONTROL METHOD THEREFOR

CROSS-REFERENCE TO RELATED APPLICATION

This application claims priority to and the benefit of Korean Patent Application No. 10-2021-0151793, filed on Nov. 5, 2021, the disclosure of which is incorporated herein by reference in its entirety.

TECHNICAL FIELD

The present disclosure relates to an electronic brake for a vehicle and a control method therefor.

BACKGROUND

This section provides background information related to the present disclosure which is not necessarily prior art.

An electronic brake forms a braking force for a wheel brake mechanism using a motor. A brake device including a motor pressurizes a working fluid within a hydraulic circuit of the electronic brake. The pressurized working fluid is selectively carried to a plurality of wheel brake mechanisms through a flow pathway which is formed by opening and closing a plurality of valves on the hydraulic circuit of the electronic brake. The plurality of wheel brake mechanisms slows down or stops wheels by using a hydraulic pressure of the carried working fluid.

An auxiliary brake device was proposed which is configured to generate a braking pressure by serving as a backup for a main brake device of a vehicle when a failure occurs to the main brake device. As a backup for a main controller for controlling the main brake device, an auxiliary controller for controlling the auxiliary brake device may be mounted along with the auxiliary brake device. The auxiliary brake system is configured to go into cooperative control, if the power output of the main brake device does not meet a set condition. Here, the phrase "the power output of the main brake device does not meet a set condition" may mean that something abnormal occurs to the main brake device.

However, even with an auxiliary brake device, a brake device for a vehicle is not able to generate a braking force required to safely run the vehicle, if an abnormality occurs to the auxiliary brake device.

SUMMARY

According to at least one aspect, the present disclosure provides a control method for an electronic brake for a vehicle, the electronic brake comprising a first braking device configured to supply hydraulic pressure to wheel brakes, a second braking device including a pump, that is connected between at least part of the wheel brakes and the first braking device and configured to fluidically disconnect an oil reservoir and an outlet of the pump when a brake pedal is pressed a predetermined distance or greater, and a control unit including a first controller for controlling the first braking device and a second controller for controlling the second braking device, the method comprising: determining, by the control unit, whether something is wrong with the first braking device; based on a determination that something is wrong with the first braking device, determining, by the control unit, whether something is wrong with a blocking valve unit mounted to the second braking device and connected between the oil reservoir and the outlet of the pump; and based on a determination that something is wrong with the blocking valve unit, controlling the first braking device by the first controller so that a flow path on the first braking device connecting the oil reservoir and the outlet of the pump is closed.

According to another aspect, the present disclosure provides an electronic brake for a vehicle, the electronic brake comprising a first braking device configured to supply hydraulic pressure to wheel brakes, a second braking device including a pump, that is connected between at least part of the wheel brakes and the first braking device and configured to fluidically disconnect an oil reservoir and an outlet of the pump when a brake pedal is pressed a predetermined distance or greater, and a control unit for controlling the first braking device and the second braking device, the control unit comprising: a first determining unit which determines whether something is wrong with the first braking device; a second determining unit which, based on a determination that something is wrong with the first braking device, determines whether something is wrong with a blocking valve unit mounted to the second braking device and connected between the oil reservoir and the outlet of the pump; a first controller which, based on a determination that something is wrong with the blocking valve unit, controls the first braking device so that a flow path on the first braking device connecting the oil reservoir and the outlet of the pump is closed; and a second controller which controls the second braking device so that the second braking device generates a required braking force.

DETAILED DESCRIPTION

Figure 1:
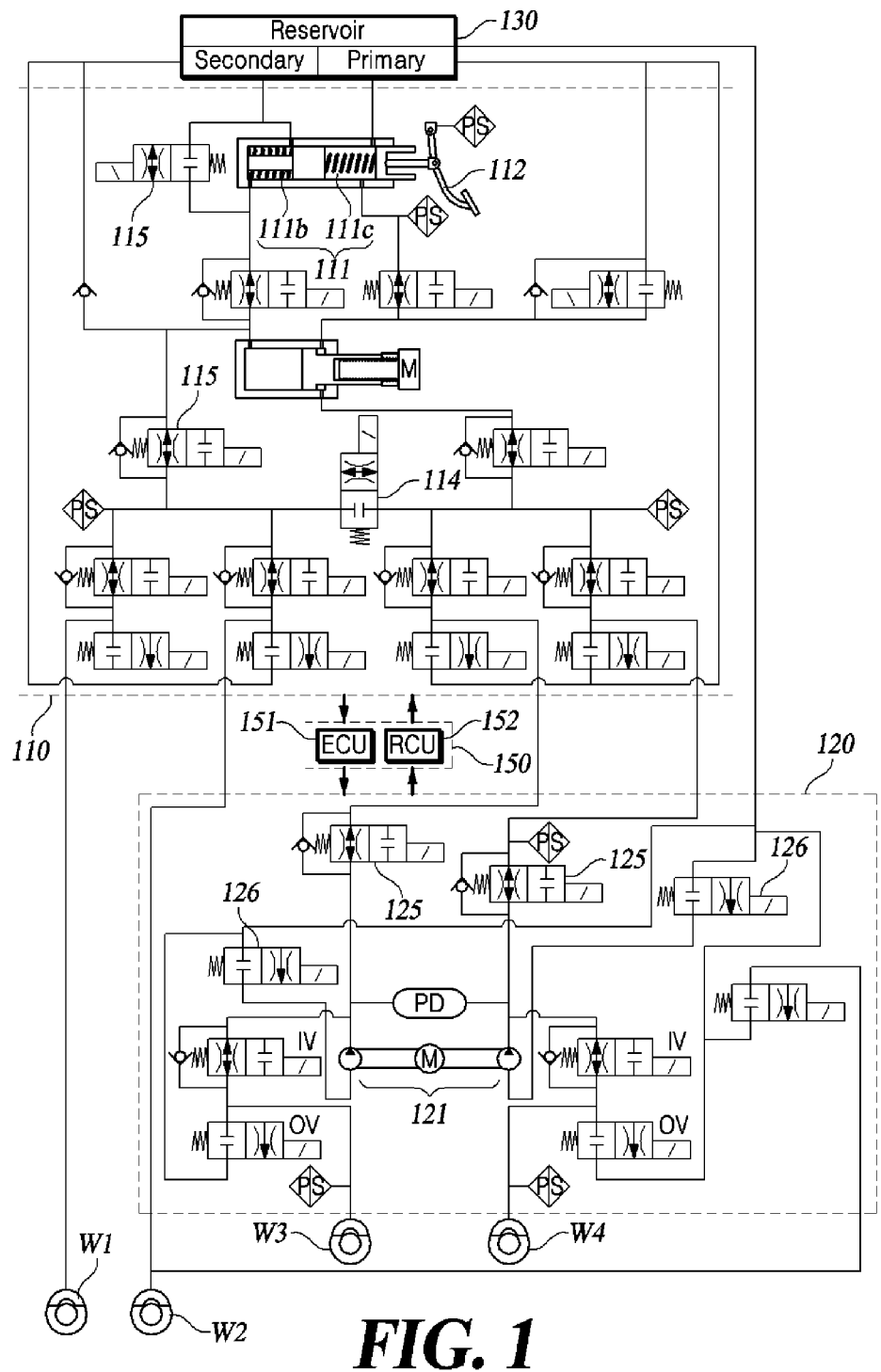
FIG. 1 is a hydraulic circuit diagram of an electronic brake for a vehicle according to an embodiment of the present disclosure.

An electronic brake for a vehicle and a control method therefor according to an embodiment of the present disclosure are able to generate a braking force required to safely run the vehicle even if something is wrong with a main brake device, by controlling an auxiliary brake device, which generates a required braking force by serving as a backup for the main brake device.

Furthermore, an electronic brake for a vehicle and a control method therefor according to an embodiment of the present disclosure are able to generate a braking force required to safely run the vehicle in a double failure situation, by controlling the main brake device by a control unit so that the main brake device delivers a hydraulic pressure formed by the auxiliary brake device to wheel brakes if something is wrong with the main brake device and the auxiliary brake device.

The aspects of the present disclosure are not limited to the foregoing, and other aspects not mentioned herein will be able to be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a hydraulic circuit diagram of an electronic brake for a vehicle according to an embodiment of the present disclosure.

In this disclosure, the terms "front" and "rear" refer to the direction in which a brake pedal 112 is pressurized and the opposite direction thereof, respectively. In this disclosure, front wheel brakes w3 and w4 and rear wheel brakes w1 and w2 refer to wheel brakes mounted to front wheels and wheel brakes mounted to rear wheels, respectively.

Referring to FIG. 1, an electronic brake for a vehicle that is controlled by a control method according to an embodiment of the present disclosure includes all or part of an oil reservoir 130, a first braking device 110, a second braking device 120, wheel brakes w1 to w4, and a control unit 150.

The wheel brakes w1 to w4 are devices that are configured to be mounted to wheels and apply a braking force to the wheels. The wheel brakes w1 to w4 may be caliper-type brakes or drum-type brakes, for example. The wheel brakes w1 to w4 are configured to be supplied with hydraulic pressure from the first and/or second braking device 110 and/or 120 and restrict the rotation of the wheels.

The oil reservoir 130 is installed to store working fluid or supply it to a hydraulic circuit. The fluid in the oil reservoir 130 may be supplied to a master cylinder 111 or a pump 121, and the fluid may be pressurized in the master cylinder 111 or the pump 121. The pressurized fluid may be selectively delivered to a plurality of wheel brakes w1 to w4 by a plurality of valves mounted on the first braking device 110 and the second braking device 120.

The first braking device 110 is configured to supply hydraulic pressure to the wheel brakes w1 to w4. The first braking device 110 is connected between the oil reservoir 130 and the wheel brakes w1 to w4. The master cylinder 111 included in the first braking device 110 may pressurize fluid, and the pressurized fluid may be delivered to the wheel brakes w1 to w4.

The master cylinder 111 includes a piston 111a configured to pressurize fluid inside of it. An inlet of the master cylinder 111 is communicated to the oil reservoir 130, and an outlet of the master cylinder 111 is communicated to the wheel brakes w1 to w4. The fluid introduced from the oil reservoir 130 to the master cylinder 111 may be pressurized within the master cylinder 111 and delivered to the wheel brakes w1 to w4. The master cylinder 111 may have two chambers divided by a piston 111a. The chamber positioned at the front of the piston 111a is referred to as a first chamber 111b, and the chamber positioned at the rear of the piston 111a is referred to as a second chamber 111c. The first chamber 111b and the second chamber 111c each may be connected to different wheel brakes w1 to w4. The first chamber 111b for the control method according to an embodiment of the present disclosure is connected to the wheel brakes w1 to w4 mounted to the rear wheels of the vehicle, and the second chamber 111c therefor is connected to the wheel brakes w1 to w4 mounted to the front wheels of the vehicle. Here, a flow path connecting the first chamber 111b and the wheel brakes w1 to w4 mounted to the rear wheels of the vehicle is referred to as a rear wheel flow path. A flow path connecting the second chamber 111c and the wheel brakes w1 to w4 mounted to the front wheels of the vehicle is referred to as a front wheel flow path. The rear wheel flow path and the front wheel flow path may be configured to be fluidically communicated or disconnected depending on whether a connection valve 114 is open or closed.

The first braking device 110 may include a switch valve unit 115 mounted on a flow path connecting the inside of the master cylinder 111 and the oil reservoir 130. When the switch valve unit 115 is opened, the master cylinder 111 and the oil reservoir 130 are communicated and a hydraulic pressure in the master cylinder 111 is reduced.

The piston 111a may be configured to slide in a direction in which it pressurizes the fluid in the master cylinder 111 as the driver pushes the pedal 112. Although not shown in FIG. 1, the master cylinder 111 may include an electronic booster that is configured to move the piston 111a based on a brake signal generated by a pedal stroke sensor, when the driver pushes the pedal 112. When the hydraulic pressure in the second chamber 111 positioned at the front of the piston 111a is reduced, the reaction force exerted on the piston 111a by the hydraulic pressure in the second chamber 111c is reduced when the piston 111a is pressurized. Accordingly, the force the driver applies to the brake pedal 112 to move the piston 111a forward is reduced.

The piston 111a has a predetermined thickness in the direction of movement. The second chamber 111c and the wheel brakes w1 to w4 mounted to the rear wheels may be fluidically communicated or disconnected depending on the amount of stroke of the piston 111a. Referring to FIG. 1, when the piston 111a, is pressed a predetermined distance or greater, an outlet made through the chamber 111c is closed by the outer periphery of the piston 1111a. In this way, the wheel brakes w1 to w4 mounted to the front wheels and the second chamber 111c are fluidically disconnected.

The second braking device 120 is connected between at least part of the wheel brakes w1 to w4 and the first braking device 110. The second braking device 120 is configured to generate a required braking force by serving as a backup for the first braking device 110, when something is wrong with the first braking device 110. Here, the required braking force is a value that is determined based on the amount of pedal stroke from the driver measured by the pedal stroke sensor, and may mean a braking force equivalent to the driver's intention to slow down or stop the vehicle. On the other hand, the required braking force may mean a braking signal calculated by the autonomous driving system of the vehicle. The second braking device 120 may be disposed in such a way as to supply hydraulic pressure to the front wheel brakes w3 and w4. The electronic brake for a vehicle according to an embodiment of the present disclosure is configured to deliver fluid to the oil reservoir 130, the first braking device 110, the second braking device 120, and the front wheel brakes w3 and w4, sequentially.

The pump 121 included in the second braking device 120 may produce a hydraulic pressure for generating the required braking force. An inlet of the pump 121 may be connected to the oil reservoir 130, and an outlet of the pump 121 may be connected to the wheel brakes w1 to w4. An inlet flow valve unit 126 may be mounted on a flow path connecting the inlet of the pump 121 and the oil reservoir 130. When the inlet flow valve unit 126 is opened, fluid may be supplied to the pump 121 from the oil reservoir 130. If the second braking device 120 needs to increase brake pressure by serving as a backup for the first braking device 110, fluid may be delivered to the pump 121 from the oil reservoir 130, and the delivered fluid may be pressurized within the pump 121 and delivered to the wheel brakes w1 to w4. The second braking device 120 may be configured such that the oil reservoir 130 and the outlet of the pump 121 are fluidically disconnected when the brake pedal 112 is pressed a predetermined distance or greater. The second chamber 111c may be configured to be communicated to the oil reservoir 130 and the second braking device 120. With this configuration, when the piston 111a is pressed a predetermined distance or greater, an outlet of the second chamber 111c leading to the second braking device 120 may be closed by the outer periphery of the piston 111a. Accordingly, a high-pressure fluid pressurized in the second braking device 120 leaks into the oil reservoir 130, thereby preventing a reduction in the pressure of the fluid.

The second braking device 120 includes all or part of a blocking valve unit 125, an inlet valve unit IV, and an outlet valve unit OV. The block valve unit 125 is connected between the oil reservoir 130 and the wheel brakes w1 to w4. The blocking valve unit 125 is connected between the oil reservoir 130 and the outlet of the pump 121. When the blocking valve unit 125 is closed, a high-pressure fluid discharged from the outlet of the pump 121 is kept from being delivered to the oil reservoir 130. Accordingly, the pressure of the fluid pressurized in the pump 121 may be transferred to the wheel brakes w1 to w4. The inlet valve unit IV is mounted on a flow path connecting the outlet of the pump 121 and the wheel brakes w1 to w4. The inlet valve unit IV may be configured as a normal open-type solenoid valve which is closed when no current is applied to it. The control unit 150 may control the inlet valve unit IV to open and the outlet valve unit OV to close so that the hydraulic pressure formed in the first and second braking devices 110 and 120 is transferred to the wheel brakes w1 to w4. On the other hand, the control unit 150 may control the inlet valve unit IV to close and the outlet valve unit OV to open so that the hydraulic pressure of the wheel brakes w1 to w4 is reduced.

Figure 2:
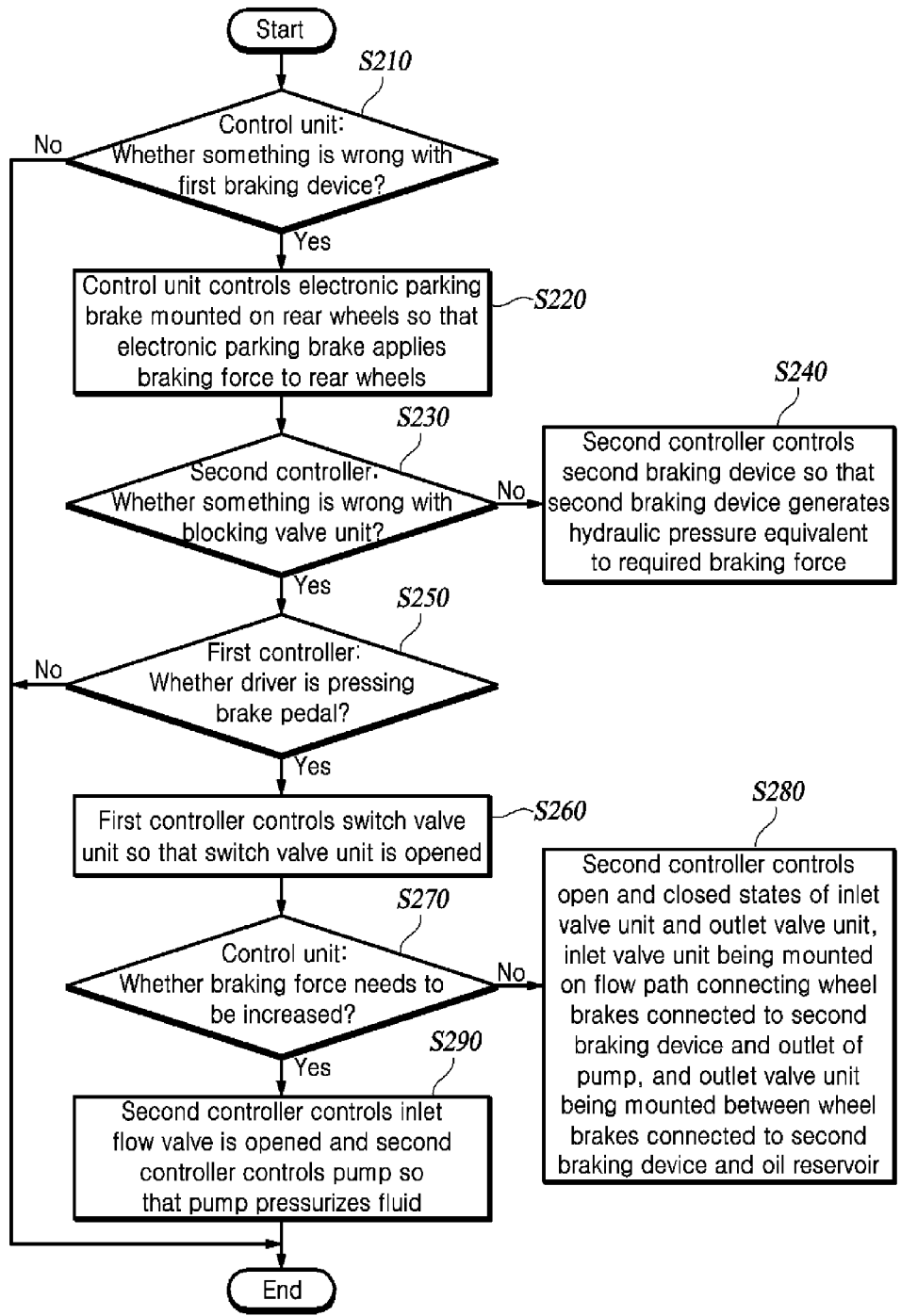
FIG. 2 is a sequence diagram of a control method according to an embodiment of the present disclosure.

FIG. 2 is a sequence diagram of a control method according to an embodiment of the present disclosure.

The control method according to an embodiment of the present disclosure may be performed by the electronic brake for a vehicle illustrated in FIG. 1.

Referring to FIGS. 1 and 2, the electronic brake for a vehicle includes the control unit 150. The control unit 150 includes a first controller 151 for controlling the first braking device 110 and a second controller 152 for controlling the second braking device 120. The control unit 150 determines whether something is wrong with the first braking device 110 (S210). The first controller 151 may determine whether something is wrong with the first braking device 110, based on a measurement from a pressure sensor mounted on the first braking device 110 or the value of a current applied to a valve mounted on the first braking device 110. For example, if a pressure measured by the pressure sensor is not high enough to be equivalent to the required braking force, the control unit 150 may determine that something is wrong with the first braking device 110. If there isn't something wrong with the first braking device 110, the control method of the present disclosure is completed.

If it is determined that something is wrong with the first braking device 110, the second controller 152 determines whether something is wrong with the blocking valve unit 125 (S230). Specifically, the second controller 152 may determine whether the blocking valve unit 125 gets stuck while opening. If something is wrong with the first braking device 110, the second controller 152 may control the second braking device 120 so that the second braking device 120 generates the required braking force by serving as a backup for the first braking device 110. If the blocking valve unit 125 gets stuck while opening, a high-pressure fluid pressurized in the second braking device 120 leaks into the oil reservoir 130, and the second braking device 120 is therefore unable to generate the required braking force by serving as a backup for the first braking device 110. The control method for the electronic brake for a vehicle allows the electronic brake for a vehicle to produce the required braking force by using the following control method even in a double failure situation (hereinafter, in the event of a double failure).

If it is determined that something is wrong with the blocking valve unit 125 in S230, the first controller 151 controls the first braking device 110 so that a flow path on the first braking device 110 that connects the oil reservoir 130 and the outlet of the pump 121 is closed (S250 to S290).

In the step S250, the first controller 151 determines whether the driver is pressing the brake pedal 112. The first controller 151 may determine whether the driver is pressing the brake pedal 112 or not, upon receiving a signal related to the amount of stroke of the brake pedal 112 from the pedal stroke sensor connected to the brake pedal 112. If it is determined that the driver is pressing the brake pedal 112, the first controller 151 controls the first braking device 110 so as to reduce a hydraulic pressure in the master cylinder 111. The control unit 150 controls the first and second braking devices 110 and 120 so that the first and second braking devices 110 and 120 produce a required braking force equivalent to the amount of pedal stroke from the driver, under a circumstance in which something is wrong with the first braking device 110 and the blocking valve unit 125.

In the step S260, the first controller 151 controls the switch valve unit 115 so that the switch valve unit 115 is opened, Once the switch valve unit 115 is opened, the hydraulic pressure in the master cylinder 111 is reduced. Accordingly, the reaction force exerted on the piston 111a by the fluid in the master cylinder 111 is reduced, making it possible to move the piston 111a forward by a small force. Once the piston 111a is moved forward a predetermined distance or greater, the oil reservoir 130 and the outlet of the pump 121 are fluidically disconnected. As such, the fluid pressurized by the pump 121 of the second braking device 120 may be delivered to the wheel brakes w1 to w4 without leaking into the oil reservoir 130. By using the control method according to the step S260, it is possible for the second braking device 120 to transfer the braking force it produces by serving as a backup for the first braking device 110 to the wheel brakes w1 to w4, when the driver presses the brake pedal 112 with a small force in the event of a double failure.

In the step S270, the control unit 150 determines whether to increase the braking force applied to the vehicle by the electronic brake for the vehicle. If the required braking force is greater than a current braking force which is calculated based on a pressure measured by a hydraulic sensor connected to the wheel brakes w1 to w4, the control unit 150 may determine that the braking force needs to be increased.

For example, if a hydraulic pressure formed in the master cylinder 111 by the driver's pedal pressure is not high enough to be equivalent to the required braking force, this may mean that the required braking force is greater than the current braking force. The second braking device 120 may form a braking force as a backup for the pedal pressure from the driver.

If it is determined that the braking force needs to be increased in the step S270, the second controller 152 controls the inlet flow valve unit 126 so that the inlet flow valve unit 126 mounted on the flow path connecting the oil reservoir 130 and the inlet of the pump 120 is opened (S290). Moreover, the second controller 152 controls the pump 121 so that the pump 121 pressurizes fluid. As such, the fluid enters the pump 121 from the oil reservoir 130, and the fluid is pressurized in the pump 121. The pressurized fluid may be delivered to the wheel brakes w1 to w4 without leaking to the oil reservoir 130 in the step S260.

On the other hand, if it is determined that the braking force does not need to be increased in the step S270, the second controller 152 controls the open and closed states of the inlet valve unit IV and the outlet valve unit OV (S280). That is, the control unit 150 may perform control of ABS (anti-lock brake system), TCS (traction control system), and so on.

If it is determined that there isn't something wrong with the blocking valve unit 125 in the step S230 the second controller 152 controls the second braking device 120 so that the second braking device 120 generates a hydraulic pressure equivalent to the required braking force (S240). That is, the second braking device 120 produces a braking pressure by serving as a backup for the first braking device 110.

If it is determined that something is wrong with the first braking device 110 in the step S210, the control unit 150 may control an electronic parking brake mounted on the rear wheels so that the electronic parking brake applies a braking force to the rear wheels (S220). The second braking device 120 supplies hydraulic pressure to the front wheel brakes w3 and w4 by supplementing some of the functions of the first braking device 110, and the electronic parking brake supplies hydraulic pressure to the rear wheel brakes w1 and w2 by supplementing other functions of the first braking device 110.

According to the control method according to an embodiment of the present disclosure, if something is wrong with the first braking device 110, the second braking device 120 and/or the electronic parking brake may produce a required braking force. Moreover, in the event of a double failure where the first braking device 110 and part of the components of the second braking device 120 fail, part of the components of the first braking device 110 and the second braking device 120 may be controlled so that the electronic brake for the vehicle produces the required braking force.

Figure 3:
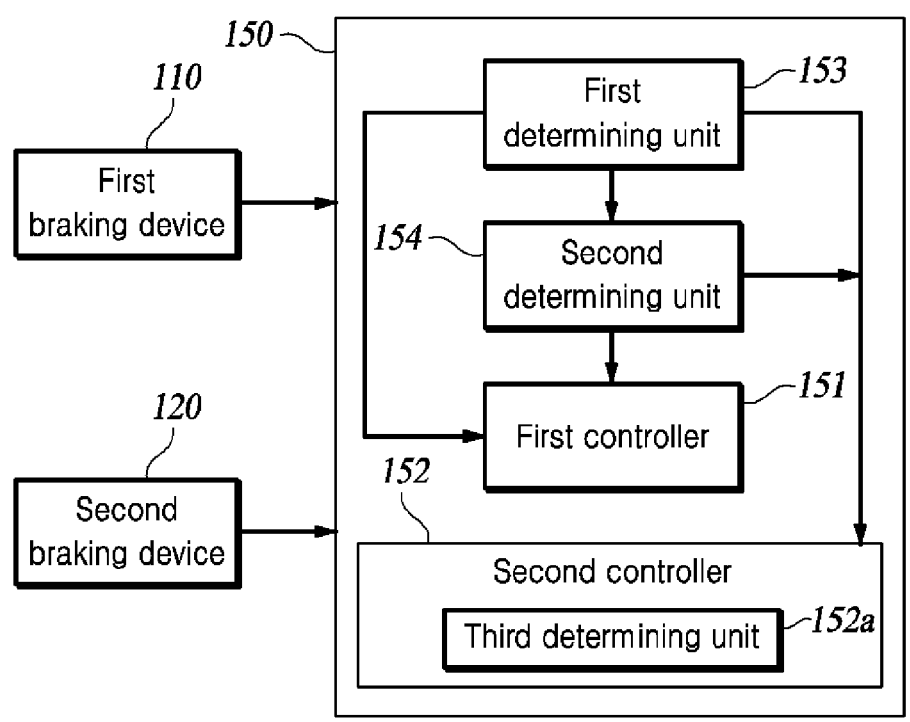
FIG. 3 is a block diagram schematically showing a configuration of an electronic brake for a vehicle according to an embodiment of the present disclosure.

FIG. 3 is a block diagram schematically showing a configuration of an electronic brake for a vehicle according to an embodiment of the present disclosure.

The electronic brake for a vehicle according to an embodiment of the present disclosure may be an electronic brake for a vehicle that is controlled by the above-described control method. Thus, redundant description will be omitted.

Referring to FIGS. 1 and 3, the electronic brake for a vehicle includes all or part of a first braking device 110, a second braking device 120, and a control unit 150. The first braking device 110 is configured to supply hydraulic pressure to the wheel brakes w1 to w4. The second braking device 120 is connected between at least part of the wheel brakes w1 to w4 and the first braking device 110. The first braking device 110 may include a master cylinder 111 having a piston 111a configured to be pressed along with a brake pedal 112. The first braking device 110 may include a switch valve unit 115. The switch valve unit 115 is mounted on a flow path connecting the inside of the master cylinder 111 and an oil reservoir 130. The second braking device 120 includes a pump 121. When the brake pedal 112 is pressed a predetermined distance or greater, the oil reservoir 130 and an outlet of the pump 121 are fluidically disconnected. The control unit 150 controls the first braking device 110 and the second braking device 120. The second braking device 120 includes a blocking valve unit 125 connected between the oil reservoir 130 and the outlet of the pump 121.

The control unit 150 includes a first determining unit 153, a second determining unit 154, a first controller 151, and a second controller 152. According to an exemplary embodiment of the present disclosure, the control unit 150 may include a processor (e.g., computer, microprocessor, CPU, ASIC, circuitry, logic circuits, etc.) and an associated non-transitory memory storing software instructions which, when executed by the processor, provides the functionalities of the first determining unit 153, the second determining unit 154, the first controller 151, and the second controller 152. Herein, the memory and the processor may be implemented as separate semiconductor circuits. Alternatively, the memory and the processor may be implemented as a single integrated semiconductor circuit. The processor may embody one or more processor(s).

The first determining unit 153 determines whether something is wrong with the first braking device 110. The first determining unit 153 may determine whether something is wrong with the first braking device 110, based on pressure information and the like received from a pressure sensor or the like of the first braking device 110. Upon determining that something is wrong with the first braking device 110, the first determining unit 153 sends a first failure signal.

The second determining unit 154 receives the first failure signal. Upon receiving the failure signal, the second determining unit 154 determines whether something is wrong with the blocking valve unit 125. Specifically, the second determining unit 154 may determine whether the blocking valve unit 125 gets stuck while opening. The second determining unit 154 may determine whether something is wrong with the blocking valve unit 125, by using a pressure measurement from a pressure sensor (not shown) mounted on a flow path of the blocking valve unit 125 on the side of the first braking device 110. Upon determining that something is wrong with the blocking valve unit 125, the second determining unit 154 may send a second failure signal.

The first controller 151 controls the first braking device 110. When the first controller 151 receives a blocking valve failure signal, the first controller 151 may control the first braking device 110 so that a flow path on the first braking device 110 connecting the oil reservoir 130 and the outlet of the pump 121 is closed. Specifically, the first controller 151 may control the first braking device 110 in such a way that the switch valve unit 115 is opened.

The second controller 152 controls the second braking device 120. The second controller 152 may include a third determining unit 152a. Upon receiving the first failure signal and/or the second failure signal, the third determining unit 152a determines whether the braking force applied to the vehicle by the electronic brake for the vehicle needs to be increased. If the third determining unit 152a determines that the braking force needs to be increased, the second controller 152 controls the inlet flow valve unit 126 to open and drives the pump. Here, the inlet flow valve unit 126 is a valve that is mounted on a flow path connecting the oil reservoir 130 and an inlet of the pump 121.

With this configuration, the electronic brake for a vehicle according to an embodiment of the present disclosure is able to produce a braking force stably even in the event of a failure where the blocking valve unit 125 gets stuck.

An electronic brake for a vehicle and a control method therefor according to an embodiment of the present disclosure have the effect of generating a braking force required to safely run the vehicle even if something is wrong with a main brake device, by controlling an auxiliary brake device, which generates a required braking force by serving as a backup for the main brake device.

Furthermore, an electronic brake for a vehicle and a control method therefor according to an embodiment of the present disclosure have the effect of generating a braking force required to safely run the vehicle in a double failure situation, by controlling the main brake device by a control unit so that the main brake device delivers a hydraulic pressure formed by the auxiliary brake device to wheel brakes if something is wrong with the main brake device and the auxiliary brake device.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A control method for an electronic brake for a vehicle, the electronic brake comprising a first braking device configured to supply hydraulic pressure to wheel brakes, a second braking device including a pump, that is connected between at least part of the wheel brakes and the first braking device and configured to fluidically disconnect an oil reservoir and an outlet of the pump when a brake pedal is pressed a predetermined distance or greater, and a control unit including a first controller for controlling the first braking device and a second controller for controlling the second braking device, the method comprising:
  determining, by the control unit, whether something is wrong with the first braking device;
  based on a determination that something is wrong with the first braking device, determining, by the control unit, whether something is wrong with a blocking valve unit mounted to the second braking device and connected between the oil reservoir and the outlet of the pump; and
  based on a determination that something is wrong with the blocking valve unit, controlling the first braking device by the first controller so that a flow path on the first braking device connecting the oil reservoir and the outlet of the pump is closed,
  wherein the determining of whether something is wrong with the blocking valve unit comprises determining whether the blocking valve unit gets stuck while opening so that a fluid pressurized in the second braking device leaks into the oil reservoir.

2. The control method of claim 1, wherein the controlling of the first braking device by the first controller further comprises:
  determining, by the first controller, whether a driver is pressing the brake pedal; and
  based on a determination that the driver is pressing the brake pedal, controlling the first braking device by the first controller so as to reduce a hydraulic pressure in a master cylinder.

3. The control method of claim 2, wherein the controlling of the first braking device by the first controller so as to reduce a hydraulic pressure in a master cylinder comprises controlling, by the first controller, a switch valve unit mounted on a flow path connecting the inside of the master cylinder and the oil reservoir so that the switch valve unit is opened.

4. The control method of claim 1, further comprising:
  determining, by the control unit, whether a braking force applied to the vehicle by the electronic brake for the vehicle needs to be increased, after the controlling of the first braking device by the first controller;
  based on a determination that the braking force needs to be increased, controlling, by the second controller, an inlet flow valve mounted on a flow path connecting the oil reservoir and an inlet of the pump so that the inlet flow valve is opened; and
  controlling the pump by the second controller so that the pump pressurizes fluid.

5. The control method of claim 4, further comprising, based on a determination that the braking force does not need to be increased, controlling open and closed states of an inlet valve unit and an outlet valve unit by the second controller, the inlet valve unit being mounted on a flow path connecting the wheel brakes connected to the second braking device and the outlet of the pump, and the outlet valve unit being mounted between the wheel brakes connected to the second braking device and the oil reservoir.

6. The control method of claim 1, further comprising, based on a determination that there is not anything wrong with the blocking valve unit, controlling the second braking device by the second controller so that the second braking device generates a hydraulic pressure equivalent to a required braking force.

7. The control method of claim 6, wherein the controlling of the second braking device by the second controller comprises controlling the blocking valve unit by the second controller so that the blocking valve unit is closed.

8. The control method of claim 1, further comprising, based on determining that something is wrong with the first braking device, controlling an electronic parking brake mounted on rear wheels by the controller unit so that the electronic parking brake applies a braking force to the rear wheels.

9. An electronic brake for a vehicle, the electronic brake comprising a first braking device configured to supply hydraulic pressure to wheel brakes, a second braking device including a pump, that is connected between at least part of the wheel brakes and the first braking device and configured to fluidically disconnect an oil reservoir and an outlet of the pump when a brake pedal is pressed a predetermined distance or greater, and a control unit for controlling the first braking device and the second braking device, the control unit comprising:
  a first determining unit configured to determine whether something is wrong with the first braking device;
  a second determining unit configured to determine, based on a determination that something is wrong with the first braking device, whether something is wrong with a blocking valve unit mounted to the second braking device and connected between the oil reservoir and the outlet of the pump;

a first controller configured to control, based on a determination that something is wrong with the blocking valve unit, the first braking device so that a flow path on the first braking device connecting the oil reservoir and the outlet of the pump is closed; and a second controller configured to control the second braking device so that the second braking device generates a required braking force, wherein the first controller determines whether the blocking valve unit gets stuck while opening so that a fluid pressurized in the second braking device leaks into the oil reservoir.

10. The electronic brake of claim 9, wherein the first braking device includes a switch valve unit mounted on a flow path connecting an inside of a master cylinder and the oil reservoir, the master cylinder having a piston configured to be pressed along with the brake pedal, and wherein, based on a determination that something is wrong with the blocking valve unit, the first controller controls the switch valve unit to open.

11. The electronic brake of claim 9, wherein the second braking device includes an inlet flow valve unit mounted on a flow path connecting the oil reservoir and an inlet of the pump, and the second controller includes a third determining unit configured to determine whether the braking force applied to the vehicle by the electronic brake for the vehicle needs to be increased, and wherein, based on a determination by the third determining unit that the braking force needs to be increased, the second controller controls the inlet flow valve unit to open and drives the pump.

* * * * *